(12) United States Patent
Willey

(10) Patent No.: US 8,678,463 B2
(45) Date of Patent: Mar. 25, 2014

(54) VEHICLE SEAT ASSEMBLY AND METHOD OF CONTROLLING A VEHICLE SEAT ASSEMBLY

(75) Inventor: Mark R. Willey, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 13/529,537

(22) Filed: Jun. 21, 2012

(65) Prior Publication Data

US 2013/0341986 A1   Dec. 26, 2013

(51) Int. Cl.
*B60N 2/06* (2006.01)
*B60N 2/22* (2006.01)

(52) U.S. Cl.
USPC ............... 296/65.01; 296/65.09; 296/65.13

(58) Field of Classification Search
USPC ........................... 296/65.01–65.18
See application file for complete search history.

(56) References Cited

U.S. PATENT DOCUMENTS

| | | | | |
|---|---|---|---|---|
| 6,106,046 A * | 8/2000 | Reichel | .................. | 296/65.09 |
| 6,195,603 B1 * | 2/2001 | Gauger et al. | .................. | 701/49 |
| 6,293,584 B1 * | 9/2001 | Levine | .................. | 280/735 |
| 6,634,669 B2 * | 10/2003 | Levine | .................. | 280/735 |
| 6,820,895 B2 * | 11/2004 | Levine | .................. | 280/735 |
| 6,916,040 B1 * | 7/2005 | Levine | .................. | 280/735 |
| 7,097,202 B2 * | 8/2006 | Levine | .................. | 280/735 |
| 7,118,178 B2 * | 10/2006 | Daniels | .................. | 297/378.1 |
| 7,364,186 B2 * | 4/2008 | Levine | .................. | 280/731 |
| 7,703,801 B2 * | 4/2010 | Levine | .................. | 280/731 |
| 2009/0072524 A1 * | 3/2009 | Levine | .................. | 280/735 |
| 2010/0102586 A1 * | 4/2010 | Jungert et al. | .................. | 296/65.05 |
| 2011/0169294 A1 * | 7/2011 | Sandmann et al. | .................. | 296/65.15 |

* cited by examiner

*Primary Examiner* — Glenn Dayoan
*Assistant Examiner* — Gregory Blankenship
(74) *Attorney, Agent, or Firm* — Cantor Colburn LLP

(57) ABSTRACT

A vehicle seat assembly includes a seat portion disposed in a relatively horizontal alignment, wherein the seat portion is moveable. Also included is a seat back rotatable about a first axis proximate a rear portion of the seat portion. Further included is a memory seat module (MSM) configured to monitor and control movement of the seat portion and the seat back, and comprises a sensor configured to activate upon movement of the seat portion and/or the seat back to a predetermined position, wherein the MSM automatically restricts movement of the seat portion and/or the seat back upon detection of activation of the sensor. The MSM further engages other required movements to return the vehicle seat assembly to earlier stored locations with the process being repeated a maximum number of times to transition the seat portion and seat back to their required positions that have been predetermined by the user.

16 Claims, 3 Drawing Sheets

VEHICLE SEAT ASSEMBLY AND METHOD OF CONTROLLING A VEHICLE SEAT ASSEMBLY

FIELD OF THE INVENTION

The subject invention relates to vehicles, and more particularly to vehicle seat assemblies, as well as a method of controlling a vehicle seat assembly.

BACKGROUND

Vehicle seats often include a costly material that encompasses the vehicle seat to provide a seated occupant of the vehicle with a level of comfort, as well as to provide an aesthetically appealing style. Typically, the vehicle seat includes a seat base portion and a seat back portion, with the seat back portion having a rear surface. Both the seat base portion and the seat back portion often include various degrees of freedom of movement. Such movement may include a rearward and forward translation of the seat base portion, rotatable "tilt" of the seat base portion, and rotatable motion of the seat back portion to allow a plurality of recline angle positions for the seated occupant to select from. Current vehicles often include powered and memory movement of the seat base portion and the seat back portion to monitor and control the movement of the seats. Vehicles employing powered and memory movement include manual operation by the seated occupant and/or a memory recall system that may be programmed to assist in moving the seat to a desired position.

Although beneficial for seated occupant comfort, such movements of the seat base portion and the seat back portion may result in contact with an object proximate the rear surface of the seat base portion and/or the seat back portion. This is particularly common in vehicles with a single seat row, such as vans, trucks and sports cars, for example, with a bulkhead disposed in close proximity to the rear surface of the vehicle seat. Unfortunately, such contact may result in damage to the seat surface, thereby detracting from the aesthetic appeal of the vehicle and potentially requiring costly improvements to remedy such damage.

SUMMARY OF THE INVENTION

In one exemplary embodiment of the invention, a vehicle seat assembly includes a seat portion disposed in a relatively horizontal alignment, wherein the seat portion is moveable in at least one direction. Also included is a seat back rotatable about a first axis proximate a rear portion of the seat portion. Further included is a memory seat module configured to monitor and control movement of the seat portion and the seat back, wherein the memory seat module comprises a sensor configured to activate upon movement of at least one of the seat portion and the seat back to a predetermined position, wherein the memory seat module restricts movement of at least one of the seat portion and the seat back upon detection of activation of the sensor.

In another exemplary embodiment of the invention, a method of controlling a vehicle seat back is provided. The method includes monitoring the position of at least one of a seat portion and a seat back, wherein the seat portion is moveable in at least one direction and the seat back is rotatable about a first axis proximate a rear portion of the seat portion. Also included is activating a sensor upon movement of at least one of the seat portion and the seat back to a predetermined position. Further included is restricting movement of at least one of the seat portion and the seat back upon detection of activation of the sensor.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
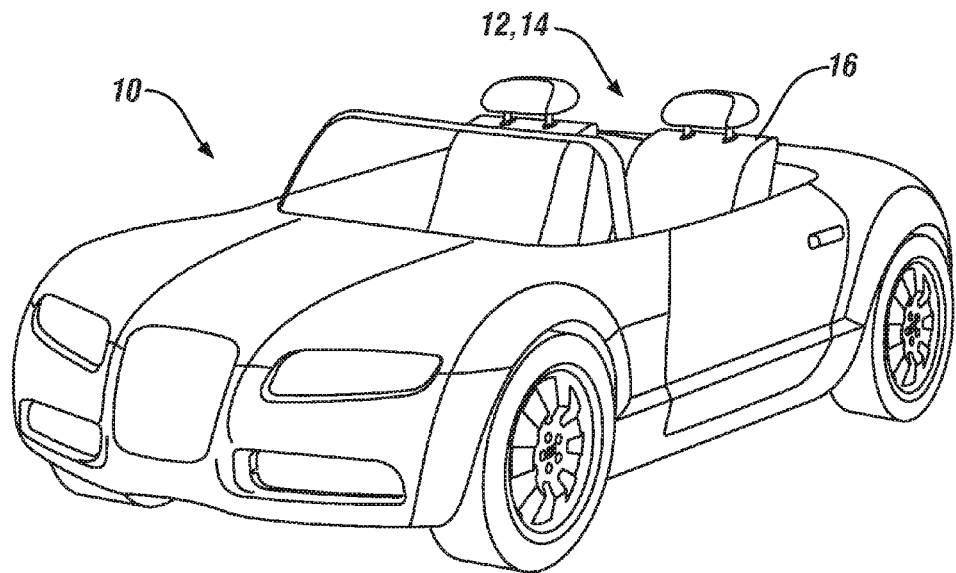
FIG. 1 is a perspective view of a vehicle having a vehicle seat assembly within an interior region of the vehicle.

The following description is merely exemplary in nature and is not intended to limit the present disclosure, its application or uses. It should be understood that throughout the drawings, corresponding reference numerals indicate like or corresponding parts and features.

Figure 2:
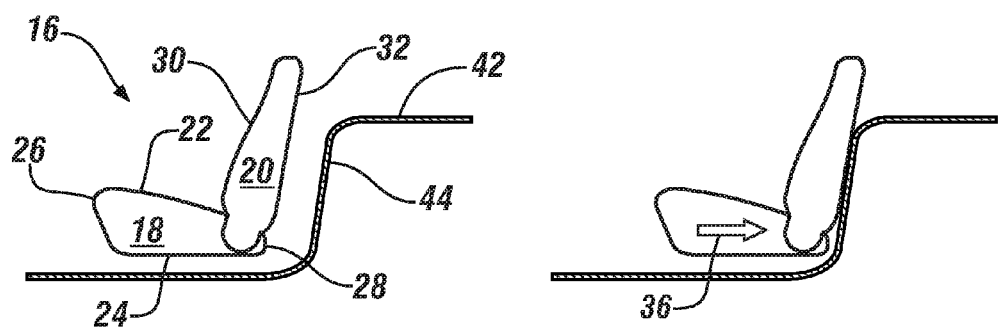
FIG. 2 is a schematic illustration of various movements of a seat of the vehicle seat assembly.
Figure 2:
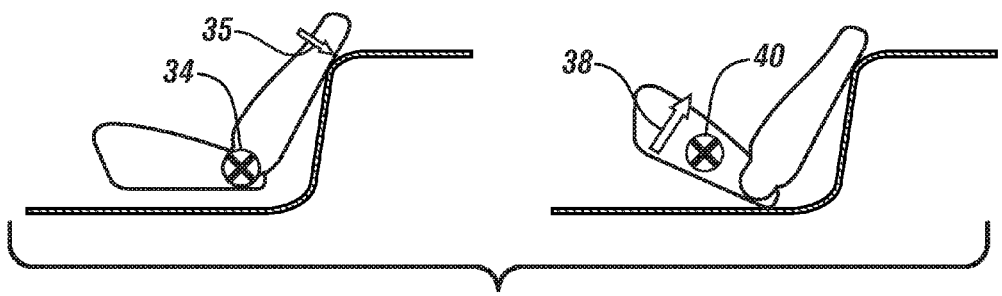

Referring to FIGS. 1 and 2, in accordance with an exemplary embodiment of the invention, a vehicle is shown in the form of an automobile and is generally referred to with numeral 10. Although the vehicle 10 is illustrated as an automobile having a single seat row, it is to be appreciated that the embodiments disclosed herein may be employed in combination with various alternative types of vehicles. With respect to an automobile, it is to be further appreciated that the specific type of automobile is irrelevant to carrying out the embodiments described below. For example, the automobile may include a car, truck, sport utility vehicle (SUV) or van. The preceding list is merely illustrative and is not intended to be limiting of the numerous automobile types that may benefit from the embodiments of the invention.

As noted above, a variety of automobiles may benefit from the embodiments described herein, however, with one embodiment including a vehicle seat assembly 12 comprising a single seat row 14 having a vehicle seat 16, but typically a plurality of seats such as two, for example and as illustrated, is included. The vehicle seat 16 is formed of a seat portion 18 for supporting a seated occupant (not illustrated) of the vehicle 10, as well as a seat back 20 for providing a back support structure for the seated occupant. The seat portion 18 includes a top surface 22, a bottom surface 24, a front side 26 and a rear side 28. Similarly, the seat back 20 includes a forward surface 30 for contacting and supporting the seated occupant and a rear surface 32. Each of the seat portion 18 and the seat back 20 may be formed from numerous suitable materials in various adequate methods of construction, with the precise material and construction being irrelevant to the embodiments of the invention described herein. The seat back 20 is operably coupled to the seat portion 18 and is rotatable about a first axis 34 in a recline direction 35 corresponding to a location proximate the rear side 28 of the seat portion 18. The seat portion 18 is moveable in at least one direction, such as in a forward and rearward translatable direction 36 along a relatively horizontal plane and/or in a rotatable direction 38 about a second axis 40.

Both the seat portion 18 and the seat back 20 are typically fully or partially enclosed with a surface material to serve a variety of purposes. The surface material may comprise numerous suitable materials, such as fabric and leather, for example. In addition to the surface material physically containing the interior material that forms the seat portion 18 and the seat back 20, the surface material typically is of a texture that is comfortable for the seated occupant to reside on and provides an aesthetically appealing style for the vehicle seat assembly 12.

In an embodiment having the single seat row 14, as described above, a structural object 42, such as a bulkhead, typically is disposed proximate the rear side 28 of the seat portion 18 and the rear surface 32 of the seat back 20. The structural object 42 may include a surface material having a rough surface that includes one or more protrusions, as well as a geometry having a corner 44.

Figure 3:
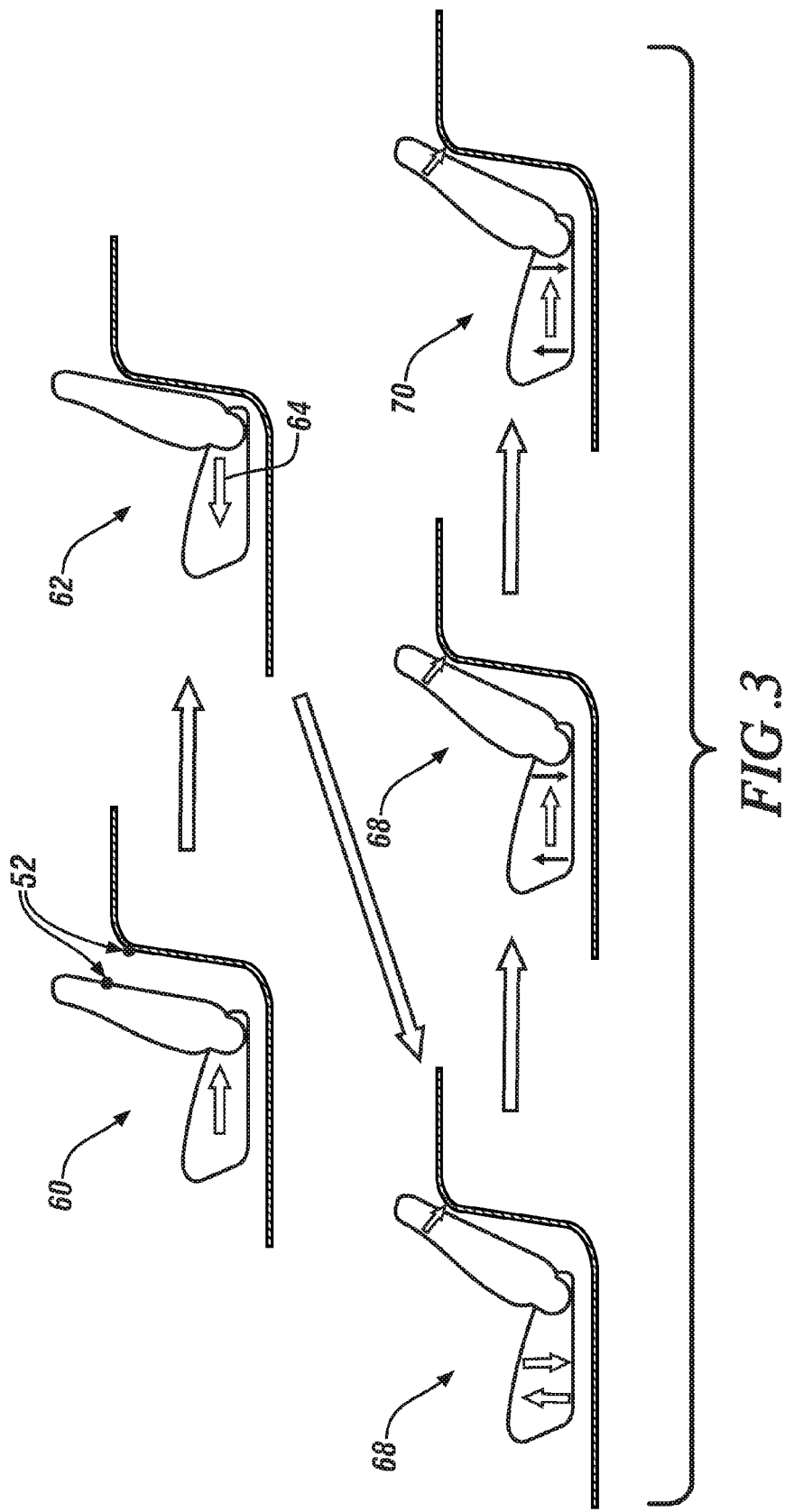
FIG. 3 is a schematic illustration of a memory recall process for reducing damage to the seat according to a first embodiment.
Figure 4:
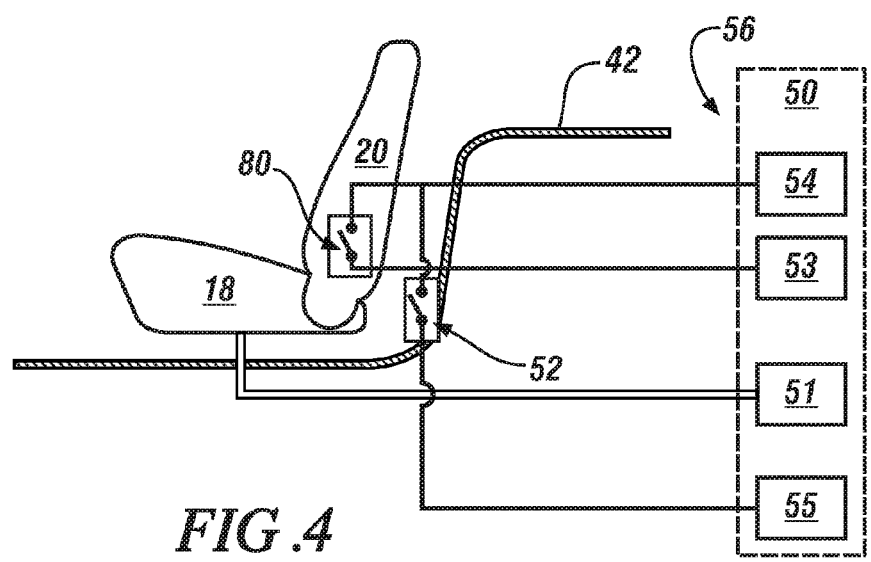
FIG. 4 is a schematic illustration of a memory seat module for monitoring and controlling the seat and providing diagnostic and/or seat interface conditions.

Referring now to FIGS. 3 and 4, according to a first embodiment, to reduce or eliminate the damage to the rear side 28 of the seat portion 18 and/or the rear surface 32 of the seat back 20, a memory seat module (MSM) 50 is provided to monitor and control the above-described movements of the seat portion 18 and the seat back 20, particularly with respect to movement to locations in close proximity or contact with the structural object 42 disposed rearward of the vehicle seat 16. The MSM 50 is typically integrated with a global controls system of the vehicle 10 and is provided with electrical power. The MSM 50 is configured to enable the seated occupant to manually power movement of the seat portion 18 and the seat back 20. In such a way, the seated occupant may achieve a desirable configuration of the vehicle seat 16. Additionally, once the desirable configuration is achieved, the seated occupant may optionally program the MSM 50 to recall the desirable configuration, even subsequent to deviation from that configuration. Such movement is enabled by circuits 51 that work in conjunction with one or more motors and actuators.

Irrespective of whether the vehicle seat 16 is undergoing a manually powered movement by the seated occupant or an automated recall movement based on the programmed desired position described above, the MSM 50 is configured to monitor the proximity of the seat portion 18 and the seat back 20 to the structural object 42. Various proximity devices may be employed, with one example comprising a bulkhead sensor 52 that is mounted to one or both of the vehicle seat 16 and the structural object 42. The bulkhead sensor 52 typically comprises one or more switches. For an embodiment where the bulkhead sensor 52 is mounted to the vehicle seat 16, the bulkhead sensor 52 is typically mounted to the rear surface 32 of the seat back 20, however, it is contemplated that the bulkhead sensor 52 is mounted to additional areas, such as the rear side 28 of the seat portion 18. Regardless of whether the bulkhead sensor 52 is mounted to the vehicle seat 16 or the structural object 42, or both, it is to be appreciated that the bulkhead sensor 52 is configured to sense contact or close proximity between the rear surface 32 of the seat back 20 and the structural object 42.

During movement of either or both of the seat portion 18 and the seat back 20, the MSM 50 performs diagnostic processes to monitor the movement by activating a switched battery output 54 comprising a software controlled output that sources a battery when activated. The switched battery output 54 is in operable communication with the bulkhead sensor 52, thereby forming an electrical circuit 56. Additionally, as will be described in detail below with reference to FIG. 5, the switched battery output 54 may be in operable communication with additional components, such as other sensors configured to monitor other seat regions and movements, but requires an understanding of resulting impacts to planned fail safe operations. A digital input 53 that is normally grounded senses active input when the battery voltage level is applied. Activation of the switched battery output 54 to the bulkhead sensor 52 communicates to the MSM 50 whether the bulkhead sensor 52 is in an activated state or a deactivated state, thereby providing knowledge as to whether the vehicle seat 16 is in contact with the structural object 42 during movement of the vehicle seat 16. If the bulkhead sensor 52 is in the activated state, the vehicle seat 16 has reached a predetermined position, such as contact with the structural object 42, and a short to battery electrical circuit is configured. Conversely, in a deactivated state, the vehicle seat 16 has not reached the predetermined position, and a short to ground electrical circuit is configured. Although the preceding configurations with respect to the activated state and the deactivated state are the contemplated arrangements, it is conceivable that a switched ground arrangement is employed, rather than a switched battery configuration.

Detection of the activated state results in the MSM 50 immediately restricting further movement of the seat portion 18 and the seat back 20, performing diagnostic check of inputs for a short to battery condition, and subsequently translating the seat portion 18 forward a predetermined distance. The MSM 50 is configured to continuously monitor whether the bulkhead sensor 52 is in the activated state and if that is the case, subsequent to the forward translation of the seat portion 18, the MSM 50 deactivates the switched battery output 54 to perform a diagnostic check of the switched battery output 54. If the bulkhead sensor 52 is still in the activated state, or a fault condition of the switched battery output 54 is determined, no additional movements that may result in rearward movement of the seat portion 18 and the seat back 20 are permitted by the MSM 50 for the duration of an ignition cycle of the vehicle 10. In some applications, normal operation may be provided upon a successful short to battery diagnostic recheck of the input. However, if the bulkhead sensor 52 is in the deactivated state, normal supervised movement of the seat portion 18 and/or the seat back 20 is permitted.

For a situation where the MSM 50 was in the process of an automatic movement when the bulkhead sensor 52 was activated, the MSM 50 shall attempt to complete the automatic movement, with the exception of rearward translation of the seat portion 18. Upon the completion of a delay, the MSM 50 may attempt to complete the required rearward movement of the vehicle seat 16. Another embodiment may provide the same intended operation by moving the seat portion 18 forward and delaying activation of the seat back 20 instead of the seat portion 18 rearward movement.

The structure and method of operation of the MSM 50, as well as the overall movement of the vehicle seat 16 is schematically illustrated (FIG. 3). As the seat is moved rearward 60, contact may be made 62 with the structural object 42, thereby triggering the bulkhead sensor 52 and causing the MSM 50 to initiate the processes described above. Corrective actions to reduce or eliminate damage to the surface material of the vehicle seat 16 include restricting further rearward movement and moving the seat portion slightly forward 64 to ensure a non-contact position between the vehicle seat 16 and the structural object 42. Subsequent to a diagnostic check, the MSM 50 allows the vehicle seat 16 to resume motions 68 that achieve a desired position 70 for the seated occupant.

Figure 5:
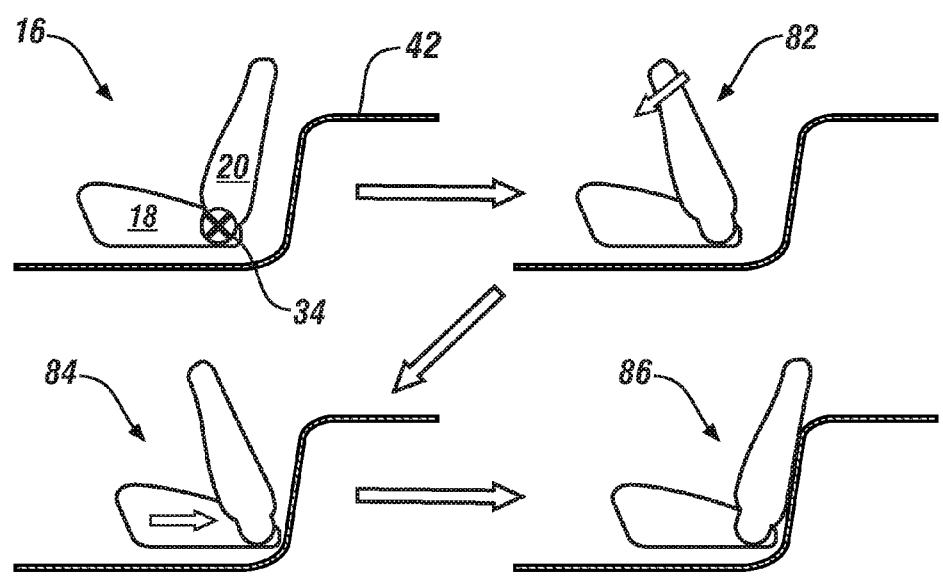
FIG. 5 is a schematic illustration of an automatic seat adjustment process for reducing damage to the seat according to a second embodiment.

Referring now to FIG. 5, in addition to FIG. 4, according to a second embodiment, a similar MSM 50 monitoring and control structure and method are employed to prevent the seat portion 18 from rearward translation while the seat back 20 is disposed in a "dump" position, defined by a forward recline angle of the seat back 20 past a predetermined position or angle. Similar to the bulkhead sensor 52 described above, a seat back dump sensor 80 is provided to monitor and control movement of the seat portion 18 and seat back 20. Upon movements of the vehicle seat 16, particularly of forward rotation 82 of the seat back 20, the MSM 50 activates the switched battery output 54, which is in operable communication with the seat back dump sensor 80, to the seat back dump sensor 80, thereby forming the electrical circuit 56. As is the case with the bulkhead sensor 52, a digital input 55 that is normally grounded senses active input when the battery voltage level is applied. The remaining monitoring diagnostic and control scheme upon fault detection is identical to that described in detail above with respect to the first embodiment, as movement is restricted 84. The monitoring and control scheme reduces or eliminates the likelihood of the seat back 20 contacting the structural object 42 upon recline, following manual powered or automatic movement of the vehicle seat 16 to the recalled and desired configuration 86.

Although the first and second embodiments have been described separately, it is to be appreciated that the embodiments described herein are contemplated to work in conjunction as a single embodiment with both the bulkhead sensor 52 and the seat back dump sensor 80.

Figure 6:
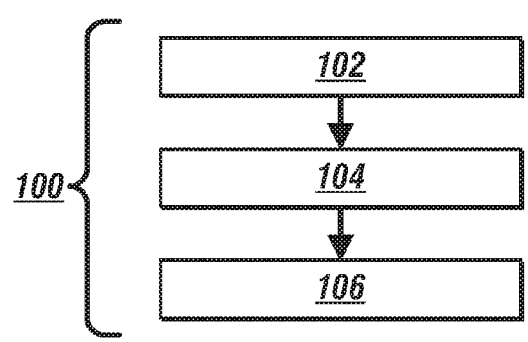
FIG. 6 is a flow diagram illustrating a method of controlling the vehicle seat assembly.

A method 100 of controlling a vehicle seat assembly is also provided as illustrated in FIG. 6 and with reference to FIGS. 1-5. Although the method 100 of controlling a vehicle seat assembly has been described in detail above, with reference to both the first and the second embodiments, the flow diagram of FIG. 6 further illustrates the method. The vehicle 10, and more specifically the vehicle seat assembly 16 have been previously described and specific structural components need not be described in further detail. The method 100 of controlling a vehicle seat assembly includes monitoring the position of at least one of a seat portion and a seat back 102. A sensor is activated upon movement of at least one of the seat portion and the seat back to a predetermined position 104. Upon sensor activation, the seat portion 18 moves forward and movement of at least one of the seat portion and the seat back is restricted 106.

Advantageously, the vehicle seat assembly 12 and the MSM 50 combine to reduce the likelihood of damage to the seat back 20 due to being in contact with the structural object 42, such as a bulkhead disposed behind the vehicle seat 16. Monitoring and controlling the seat portion 18 and the seat back 20 during movement of the vehicle seat 16 ensures that the seat back 20 will not be in contact with the structural object 42 for an extended period of time, thereby avoiding potential damage to the seat back 20.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle seat assembly comprising:
   a seat portion disposed in a relatively horizontal alignment, wherein the seat portion is moveable in at least one direction;
   a seat back rotatable about a first axis proximate a rear portion of the seat portion; and
   a memory seat module configured to monitor and control movement of the seat portion and the seat back, wherein the memory seat module comprises a sensor configured to activate upon movement of at least one of the seat portion and the seat back to a predetermined position, wherein the predetermined position corresponds to a contact location between an object and at least one of the seat portion and the seat back, wherein the object is disposed rearward of the seat back, wherein the memory seat module restricts movement of at least one of the seat portion and the seat back upon detection of activation of the sensor, wherein the sensor comprises a bulkhead sensor comprising at least one switch, wherein the bulkhead sensor is disposed on at least one of a rear side of the seat back and the object disposed rearward of the seat back.

2. The vehicle seat assembly of claim 1, wherein the seat portion is translatable along a first plane and rotatable about a second axis.

3. The vehicle seat assembly of claim 1, wherein the memory seat module is configured to translate the seat portion forward for a predefined distance along a first plane upon activation of the bulkhead sensor.

4. The vehicle seat assembly of claim 1, wherein the predetermined position corresponds to a combined forwardly rotated position of the seat back and a rearward translation of the seat portion.

5. A vehicle seat assembly comprising:
   a seat portion disposed in a relatively horizontal alignment, wherein the seat portion is moveable in at least one direction;
   a seat back rotatable about a first axis proximate a rear portion of the seat portion; and
   a memory seat module configured to monitor and control movement of the seat portion and the seat back, wherein the memory seat module comprises a sensor configured to activate upon movement of at least one of the seat portion and the seat back to a predetermined position, wherein the memory seat module restricts movement of at least one of the seat portion and the seat back upon detection of activation of the sensor, wherein the memory seat module is in operable communication with the sensor for providing a switched battery signal to the sensor.

6. The vehicle seat assembly of claim 5, wherein the operable communication between the memory seat module and the sensor is configured to determine whether the sensor is in an activated state or a deactivated state.

7. The vehicle seat assembly of claim 6, wherein the activated state corresponds to a short to battery electrical circuit, and wherein the deactivated state corresponds to a short to ground electrical circuit.

8. A method of controlling a vehicle seat assembly comprising:
   monitoring the position of at least one of a seat portion and a seat back, wherein the seat portion is moveable in at least one direction and the seat back is rotatable about a first axis proximate a rear portion of the seat portion;

activating a sensor upon movement of at least one of the seat portion and the seat back to a predetermined position;

restricting movement of at least one of the seat portion and the seat back upon detection of activation of the sensor; and providing a switched battery output signal to the sensor during movement of at least one of the seat portion and the seat back to form an electrical circuit.

9. The method of claim 8, further comprising initiating a diagnostic process upon detection of activation of the sensor.

10. The method of claim 9, wherein the predetermined position corresponds to a contact location between an object and at least one of the seat portion and the seat back, wherein the object is disposed rearward of the seat back.

11. The method of claim 10, wherein the predetermined position corresponds to a combined forwardly rotated position of the seat back and a rearward translation of the seat portion.

12. The method of claim 9, further comprising determining whether the sensor is in an activated state or a deactivated state based on a first configuration of the electrical circuit and a second configuration of the electrical circuit.

13. The method of claim 12, wherein the first configuration of the electrical circuit comprises a short to battery configuration corresponding to the activated state, and wherein the second configuration of the electrical circuit comprises a short to ground configuration corresponding to the deactivated state.

14. The method of claim 12, further comprising allowing movement of at least one of the seat portion and the seat back if the sensor is in the deactivated state.

15. The method of claim 8, further comprising restricting movement of at least one of the seat portion and the seat back for a predetermined time duration.

16. The method of claim 15, wherein the predetermined time duration comprises a completion of a current ignition cycle.

* * * * *